US012718397B2

(12) United States Patent
Ando

(10) Patent No.: US 12,718,397 B2
(45) Date of Patent: Aug. 25, 2026

(54) INVESTIGATION SUPPORT DEVICE AND INVESTIGATION SUPPORT METHOD

(71) Applicant: Hitachi, Ltd., Tokyo (JP)

(72) Inventor: Haru Ando, Tokyo (JP)

(73) Assignee: HITACHI, LTD., Tokyo (JP)

( * ) Notice: Subject to any disclaimer, the term of this patent is extended or adjusted under 35 U.S.C. 154(b) by 284 days.

(21) Appl. No.: 18/687,135

(22) PCT Filed: Feb. 17, 2022

(86) PCT No.: PCT/JP2022/006462
§ 371 (c)(1),
(2) Date: Feb. 27, 2024

(87) PCT Pub. No.: WO2023/053481
PCT Pub. Date: Apr. 6, 2023

(65) Prior Publication Data

US 2024/0371027 A1 Nov. 7, 2024

(30) Foreign Application Priority Data

Sep. 29, 2021 (JP) ................................ 2021-159137

(51) Int. Cl.
*G06K 9/00* (2022.01)
*G06T 5/50* (2006.01)
(Continued)

(52) U.S. Cl.
CPC .................. *G06T 7/70* (2017.01); *G06T 5/50* (2013.01); *G06V 10/44* (2022.01); *G06V 10/761* (2022.01); *G06T 2207/20221* (2013.01)

(58) Field of Classification Search
CPC ........ G06V 20/52; G06V 20/53; G06V 20/58; G06V 20/80; G06V 2201/06; G06V 20/48;
(Continued)

(56) References Cited

U.S. PATENT DOCUMENTS 11,100,332 B2 * 8/2021 Hasegawa ............ G06V 40/169
2015/0170159 A1 6/2015 Wada et al.
(Continued)

FOREIGN PATENT DOCUMENTS

CN 102186055 A * 9/2011
JP 2014-21629 A 2/2014
(Continued)

OTHER PUBLICATIONS

International Search Report of PCT/JP2022/006462 dated Mar. 22, 2022.

*Primary Examiner* — Shervin K Nakhjavan
(74) *Attorney, Agent, or Firm* — MATTINGLY & MALUR, PC

(57) ABSTRACT

An investigation support device executes first acquisition processing of acquiring an investigation result including at least one of text data, imaging data, and audio data in investigation at an investigation date and time, second acquisition processing of acquiring first imaging data imaged from a front of an investigator at the investigation date and time and second imaging data imaged from a back of the investigator at the investigation date and time, identification processing of identifying an investigation position at the investigation date and time based on at least one of the first imaging data and the second imaging data acquired by the second acquisition processing, and association processing of associating the investigation result acquired by the first acquisition processing, the second imaging data, and the investigation position identified by the identification processing with the investigation date and time.

6 Claims, 10 Drawing Sheets

(51) Int. Cl.
*G06T 7/70* (2017.01)
*G06V 10/44* (2022.01)
*G06V 10/74* (2022.01)

(58) Field of Classification Search
CPC ...... G06V 20/647; G06V 40/20; G06V 40/10; G06V 40/16; G06V 10/759; G06V 10/44; G06V 10/761; G06T 7/70; G06T 2207/30108; G06T 2207/30232; G06T 7/0002; G06T 7/0004; G06T 5/50; G06T 2207/20221; G01N 2021/8887; G01N 21/8851; G06F 16/53
See application file for complete search history.

(56) References Cited

U.S. PATENT DOCUMENTS

| | | | | |
|---|---|---|---|---|
| 2017/0061631 | A1 | 3/2017 | Karasudani et al. | |
| 2018/0181737 | A1* | 6/2018 | Tussy ..................... | G06V 40/20 |

FOREIGN PATENT DOCUMENTS

| | | | | |
|---|---|---|---|---|
| JP | 2015-64751 A | | 4/2015 | |
| JP | 2017-046209 A | | 3/2017 | |
| JP | 2018-4795 A | | 1/2018 | |
| JP | 2018133055 A | * | 8/2018 | ............... G08G 1/00 |
| JP | 2020095596 A | * | 6/2020 | ............... G08G 1/00 |
| JP | 2021-015572 A | | 2/2021 | |
| JP | 2021-043860 A | | 3/2021 | |
| WO | WO-2008022051 A2 | * | 2/2008 | ............. G01C 21/36 |
| WO | 2011/083775 A1 | | 7/2011 | |

* cited by examiner

[FIG. 1]
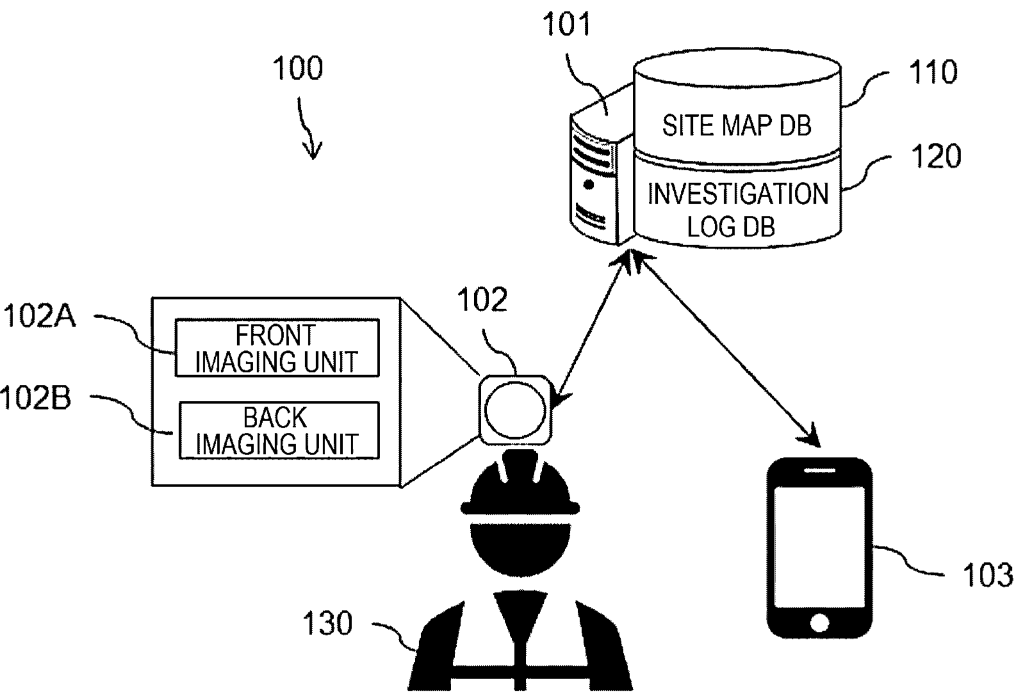
[FIG. 2]
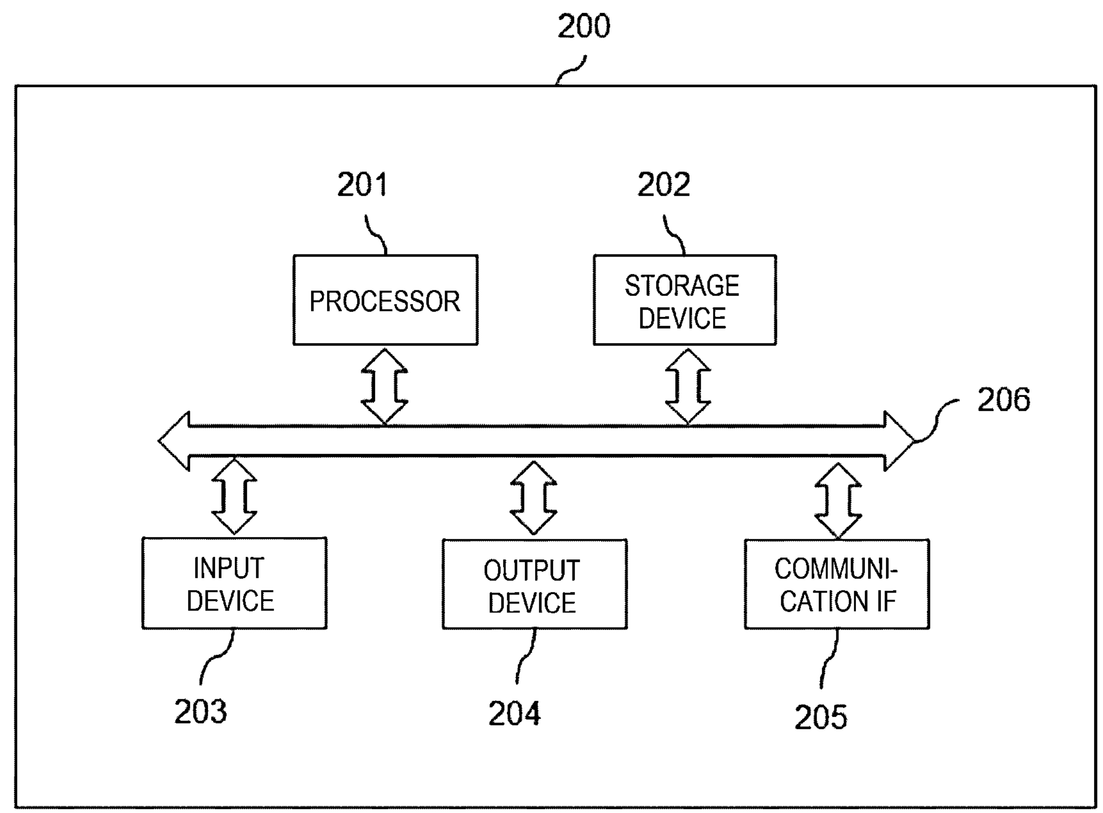

[FIG. 3]

| OBJECT ID | OBJECT NAME | SHAPE INFORMATION | POSITION INFORMATION |
|---|---|---|---|
| OB1 | ob1 | E1 | P1 |
| ... | ... | ... | ... |
| OBi | obi | Ei | Pi |
| ... | ... | ... | ... |
| OBn | obn | En | Pn |

[FIG. 4]
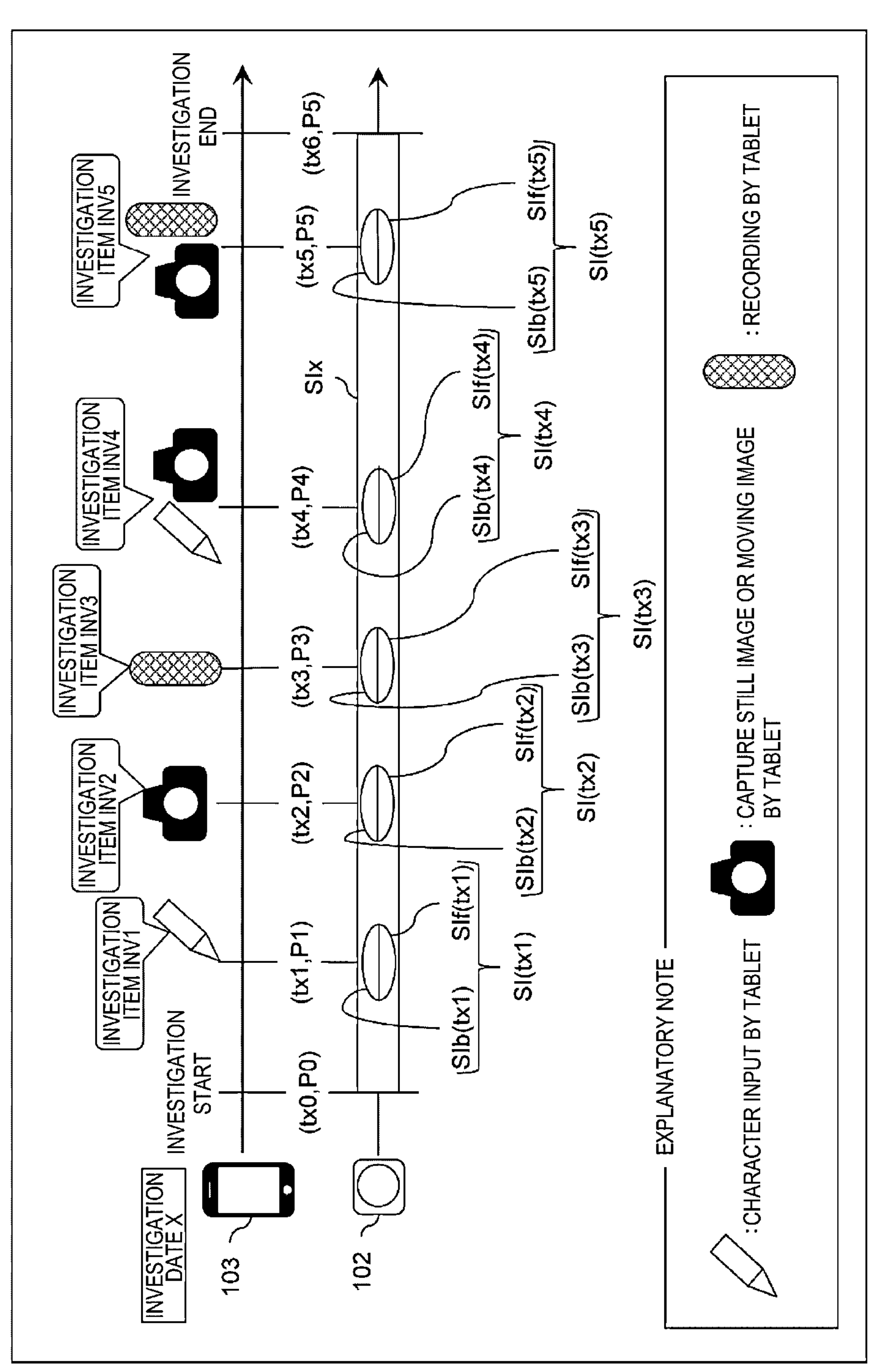

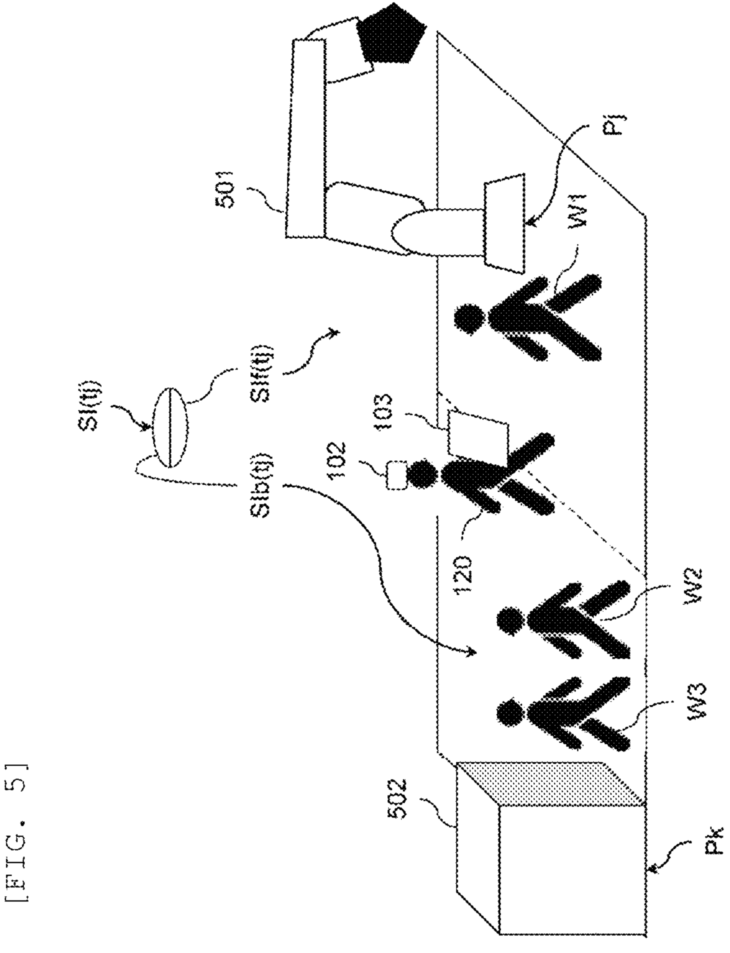
[FIG. 5]
501
502
Pj
Pk
W1
W2
W3
102
103
120
Sl(tj)
Slf(tj)
Slb(tj)

[FIG. 6]
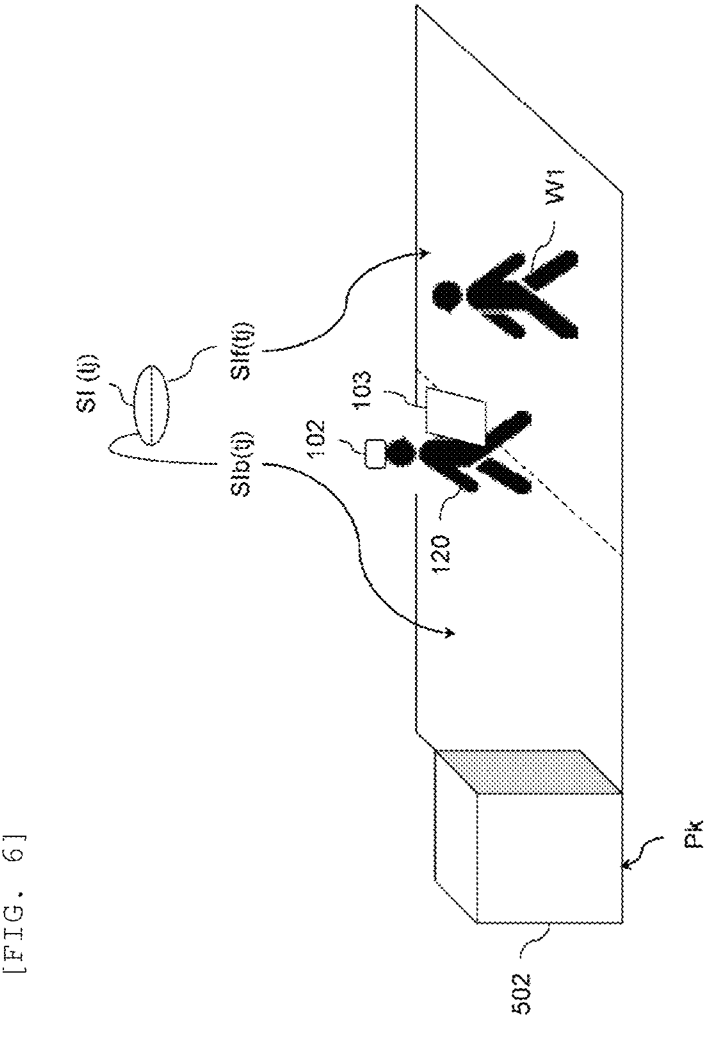

[FIG. 7]
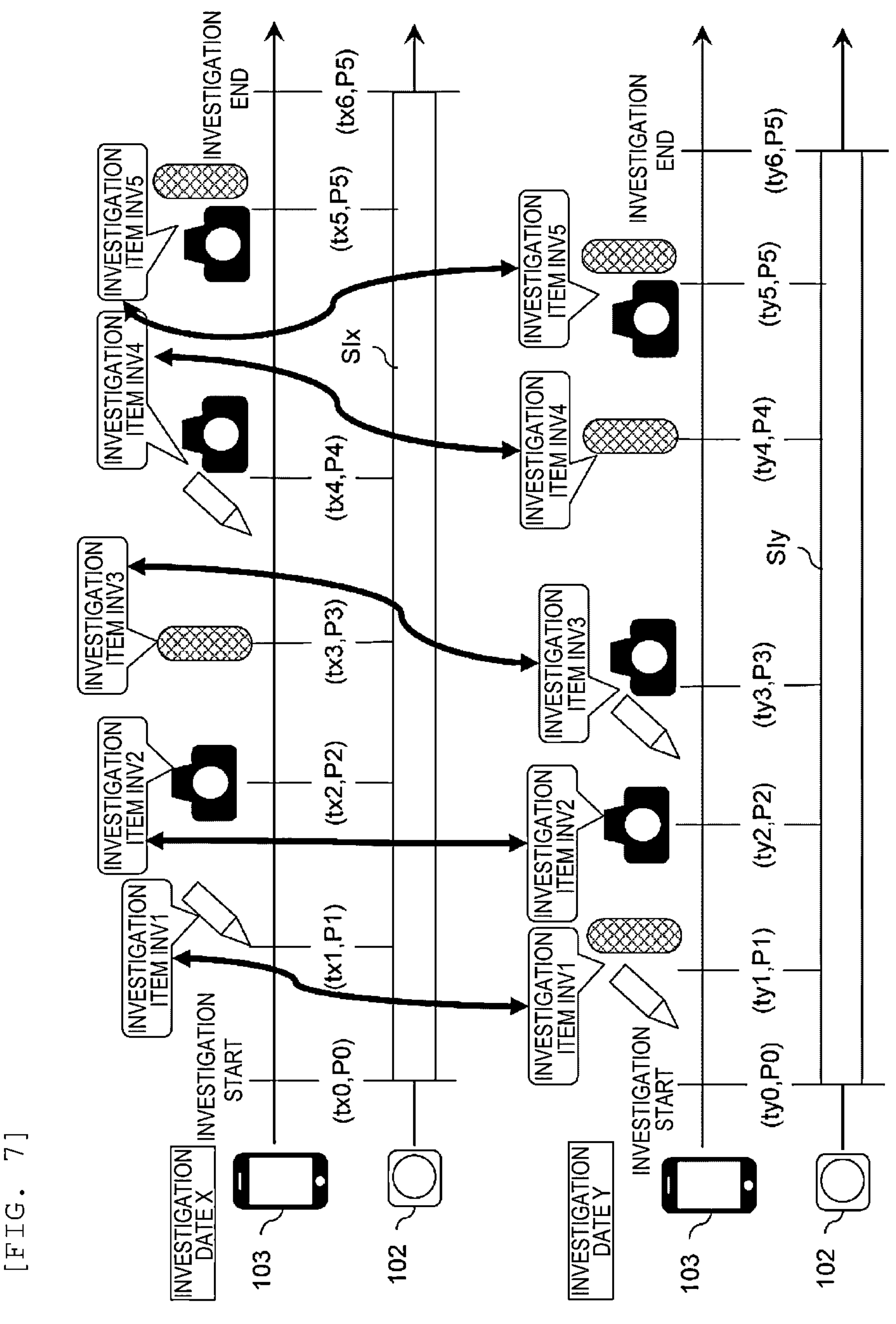

[FIG. 8]

120 INVESTIGATION LOG DB

| INVESTIGATION DATE AND TIME (801) | INVESTIGATION POSITION (802) | INVESTIGATION ITEM (803) | INVESTIGATION RESULT (804) | | | OUT-OF-VIEWING-ANGLE INFORMATION (805) | |
|---|---|---|---|---|---|---|---|
| | | | MEMORANDUM (841) | IMAGING DATA (842) | AUDIO DATA (843) | BACK IMAGING DATA (851) | RECOGNITION RESULT (852) |
| tx1 | P1 | INV1 | mx1 | — | — | SIb(tx1) | Rx1 |
| tx2 | P2 | INV2 | — | pcx2 | — | SIb(tx2) | Rx2 |
| tx3 | P3 | INV3 | — | — | vx3 | SIb(tx3) | Rx3 |
| tx4 | P4 | INV4 | mx4 | pcx4 | — | SIb(tx4) | Rx4 |
| tx5 | P5 | INV5 | — | pcx5 | vx5 | SIb(tx5) | Rx5 |
| ty1 | P1 | INV1 | my1 | — | vy1 | SIb(ty1) | Ry1 |
| ty2 | P2 | INV2 | — | pcy2 | — | SIb(ty2) | Ry2 |
| ty3 | P3 | INV3 | my3 | pcy3 | — | SIb(ty3) | Ry3 |
| ty4 | P4 | INV4 | — | — | vy4 | SIb(ty4) | Ry4 |
| ty5 | P5 | INV5 | — | pcy5 | vy5 | SIb(ty5) | Ry5 |

[FIG. 9]
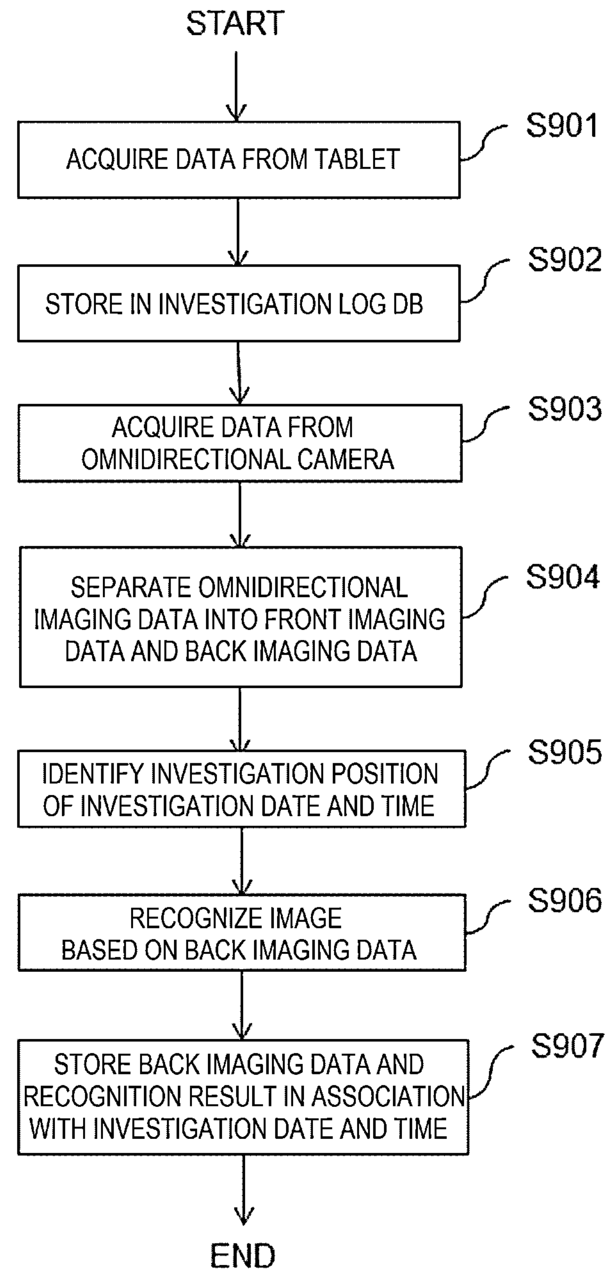

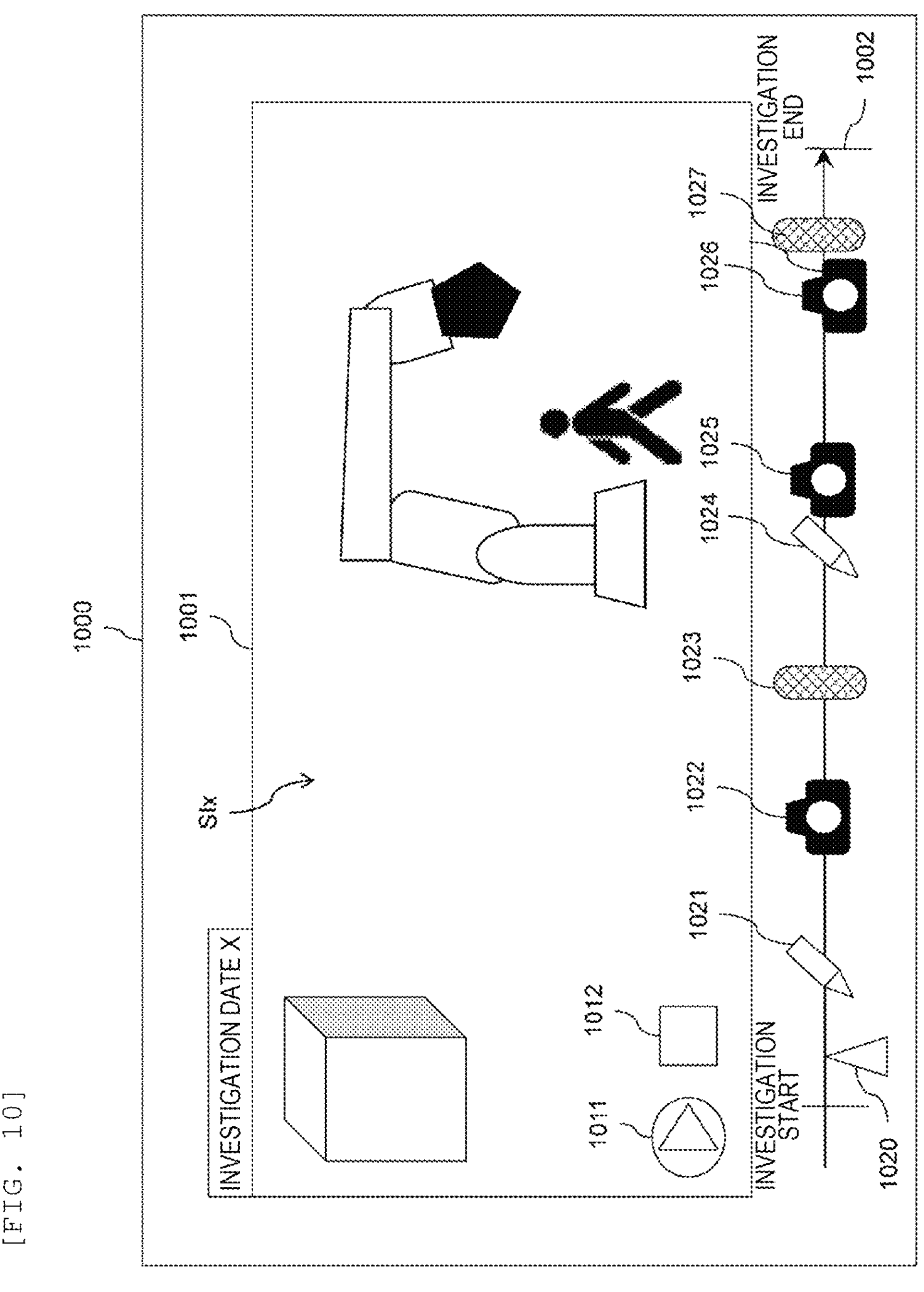
[FIG. 10]

[FIG. 11]
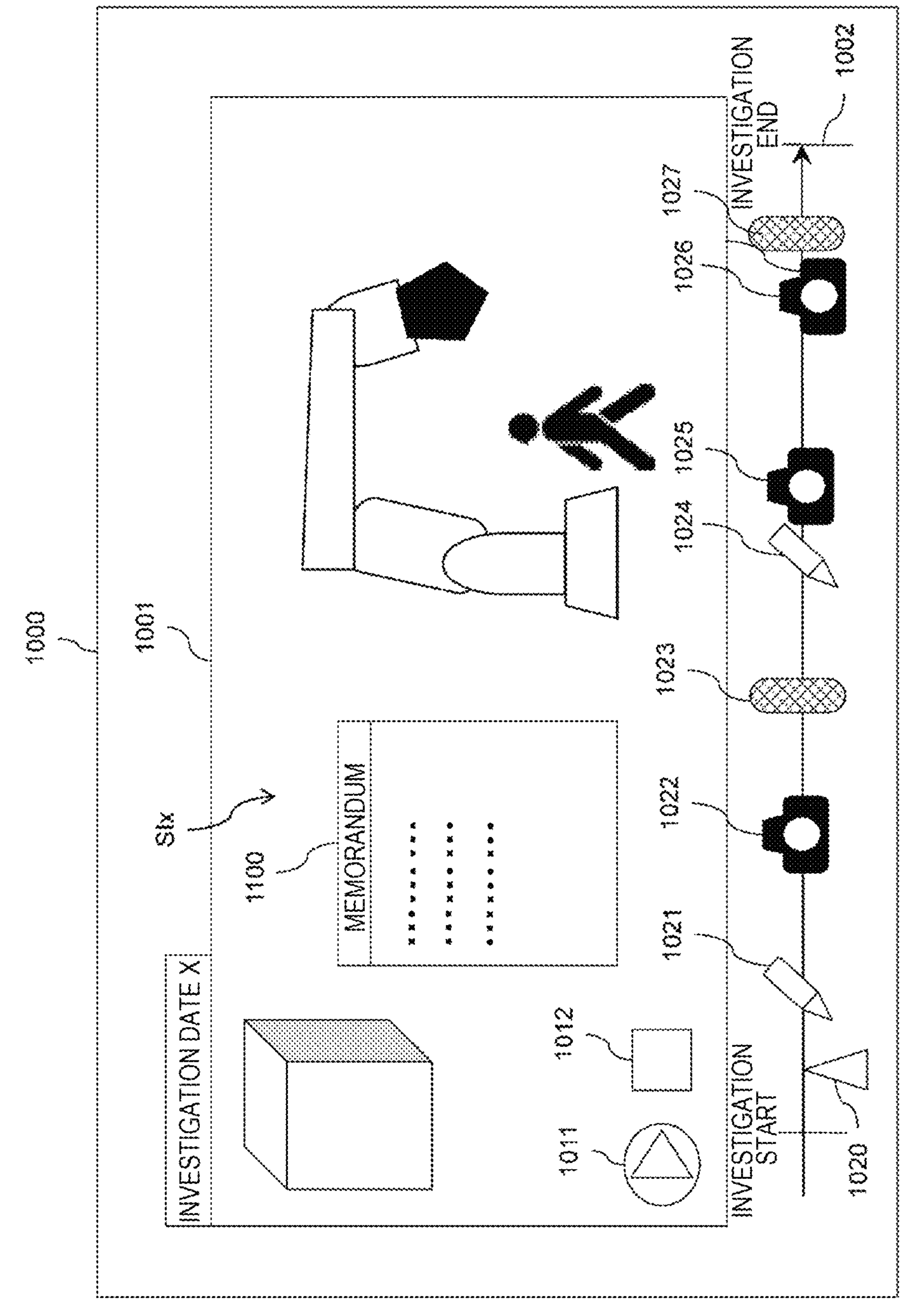

INVESTIGATION SUPPORT DEVICE AND INVESTIGATION SUPPORT METHOD

The present application is based on, and claims priority from JP Application Serial Number 2021-159137, filed Sep. 29, 2021, the disclosure of which is hereby incorporated by reference herein in its entirety.

TECHNICAL FIELD

The present invention relates to an investigation support device and an investigation support method for supporting investigation.

BACKGROUND ART

PTL 1 below discloses an action observation device in which an observer records and reproduces an action of a participant by a simple operation while observing the action of the participant. The action observation device displays a participant, on a scene to be observed, as an icon, displays movement of the participant by a trajectory, displays recorded images obtained by capturing actions to be focused on by the participant and thumbnails thereof in time series, stores the trajectory together with time data in a storage device when the icon is moved according to the movement of the participant, displays a mark at any focus point on an observation screen or the recorded images, and requests an input of attribute data including meaning of the mark.

PTL 2 below discloses an adapter unit that can be connected to an existing detector disposed on a site, can cope with a change in a site measurement point as a measurement management data content and a data amount increase with a progress of a construction work, and can perform change display and data collection on a site of civil engineering and construction measurement data. The adapter unit includes a detector interface unit, two transmission interface units for connecting adjacent units via a balanced transmission line cable and a power cable, an LED display unit for notifying a site worker of a change of a structure, a signal conversion unit for converting an analog signal into a digital signal, a memory unit, an information processing unit for outputting a display signal to the LED display unit when the digital signal is out of an allowable range, and an identification number. The adapter unit displays the change of the site according to data of the detector, and transmits the data to a data collection device provided at a terminal of a plurality of connected units.

PTL 3 below discloses a method for downloading safety investigation items. In the method, by reading a two-dimensional code attached to an LP gas supply facility and a consumption facility body, questionnaires main (investigation items) related to safety works are downloaded to a mobile terminal in real time at a work site, and an investigation result is aggregated in a server by data communication.

CITATION LIST

Patent Literature

PTL 1: JP2018-4795A

PTL 2: WO2011/083775

PTL 3: JP2014-21629A

SUMMARY OF INVENTION

Technical Problem

However, a range viewed by an investigator is only the inside of a viewing angle, and video information outside the viewing angle cannot be viewed. Therefore, a failure may occur in investigation. In order to solve such a failure, no consideration is given to the above-described related art.

An object of the invention is to improve investigation accuracy.

Solution to Problem

An investigation support device according to one aspect of the invention disclosed in the present application is an investigation support device including a processor that executes a program and a storage device that stores the program. The processor is configured to execute first acquisition processing of acquiring an investigation result including at least one of text data, imaging data, and audio data in investigation at an investigation date and time, second acquisition processing of acquiring first imaging data imaged from a front of an investigator at the investigation date and time and second imaging data imaged from a back of the investigator at the investigation date and time, identification processing of identifying an investigation position at the investigation date and time based on at least one of the first imaging data and the second imaging data acquired by the second acquisition processing, and association processing of associating the investigation result acquired by the first acquisition processing, the second imaging data, and the investigation position identified by the identification processing with the investigation date and time.

Advantageous Effects of Invention

According to a representative embodiment of the invention, it is possible to improve investigation accuracy. Problems, configurations, and effects other than those described above will be clarified by descriptions of the following embodiments.

BRIEF DESCRIPTION OF DRAWINGS

FIG. 1 is a diagram showing a system configuration example of an investigation support system.

FIG. 2 is a block diagram showing a hardware configuration example of an investigation support device.

FIG. 3 is a diagram showing an example of a site map DB.

FIG. 4 is a time chart showing an action example of an investigator.

FIG. 5 is a diagram showing an information identification example 1 by a server.

FIG. 6 is a diagram showing an information identification example 2 by the server.

FIG. 7 is a diagram showing a relationship between investigation results on different investigation dates.

FIG. 8 is a diagram showing an example of an investigation log DB.

FIG. 9 is a flowchart showing an example of an investigation support processing procedure by the server.

FIG. 10 is a diagram showing a display example on a tablet.

FIG. 11 is a diagram showing a display example of an investigation result when an investigation result icon is pressed.

DESCRIPTION OF EMBODIMENTS

<System Configuration Example of Investigation Support System>

FIG. 1 is a diagram showing a system configuration example of an investigation support system. An investigation support system 100 includes a server 101, an omnidirectional camera 102, and a tablet 103. The server 101 is communicably connected to the omnidirectional camera 102 and the tablet 103. The server 101 can access a site map DB 110 and an investigation log DB 120. Specifically, for example, the server 101 may store the site map DB 110 and the investigation log DB 120, and may be communicably connected to a computer that stores the site map DB 110 and the investigation log DB 120.

The site map DB 110 stores map information of a site to be investigated. The investigation log DB stores data acquired from the omnidirectional camera 102 and the tablet 103 as an investigation log. The server 101 uses the data acquired from the omnidirectional camera 102 and the tablet 103 to execute processing of supporting investigation of an investigator 130.

The omnidirectional camera 102 captures an image of a subject to generate omnidirectional imaging data. The omnidirectional camera 102 includes a front imaging unit 102A and a back imaging unit 102B. The front imaging unit 102A and the back imaging unit 102B each include an imaging element and a lens. A back surface of the imaging element of the front imaging unit 102A is disposed to face a back surface of the imaging element of the back imaging unit 102B.

The front imaging unit 102A and the back imaging unit 102B have the same viewing angle (for example, 210 degrees). The omnidirectional camera 102 is disposed at a top portion of the head of the investigator 130 such that a direction of the front imaging unit 102A (an optical axis of the lens) is a line-of-sight direction of the investigator 130.

The front imaging unit 102A and the back imaging unit 102B generate front imaging data and back imaging data, respectively. The omnidirectional camera 102 generates the omnidirectional imaging data by stitching and combining the front imaging data and the back imaging data. The generation of the omnidirectional imaging data may be executed by the server 101 or the tablet 103.

The omnidirectional camera 102 includes a microphone and can also record ambient sound. The microphone may be provided in each of the front imaging unit 102A and the back imaging unit 102B. By setting directions of the microphones respectively to the directions of the optical axes of the lenses of the front imaging unit 102A and the back imaging unit 102B, it is possible to generate audio data on a front side together with the imaging data of the front imaging unit 102A and generate audio data on a back side together with the imaging data of the back imaging unit 102B.

The omnidirectional camera 102 may be communicably connected to the tablet 103. In this case, the omnidirectional camera 102 can transmit the generated data to the server 101.

The tablet 103 is a computer carried by the investigator 130, and can execute an investigation support application. The investigation support application is software capable of displaying an investigation item to be investigated and inputting an investigation result for the investigation item by a user operation. The investigation result is text data input by the user operation, imaging data (still image or moving image) imaged by a camera of the tablet by the user operation, or audio data recorded by the user operation. In addition, the tablet 103 may have a function of positioning a current position using a GPS system. The tablet 103 may have a function of the server 101 described above.

<Hardware Configuration Example of Investigation Support Device (Server 101, Tablet 103)>

FIG. 2 is a block diagram showing a hardware configuration example of an investigation support device. An investigation support device 200 includes a processor 201, a storage device 202, an input device 203, an output device 204, and a communication interface (communication IF) 205. The processor 201, the storage device 202, the input device 203, the output device 204, and the communication IF 205 are connected by a bus 206. The processor 201 controls the investigation support device 200. The storage device 202 is a work area of the processor 201. In addition, the storage device 202 is a non-transitory or transitory recording medium that stores various programs or data. Examples of the storage device 202 include a read only memory (ROM), a random access memory (RAM), a hard disk drive (HDD), and a flash memory. The input device 203 inputs data. Examples of the input device 203 include a keyboard, a mouse, a touch panel, a numeric keypad, a scanner, a microphone, and a sensor. The output device 204 outputs data. Examples of the output device 204 include a display, a printer, and a speaker. The communication IF 205 is connected to a network to transmit and receive data.

<Site Map DB 110>

Figure 3:
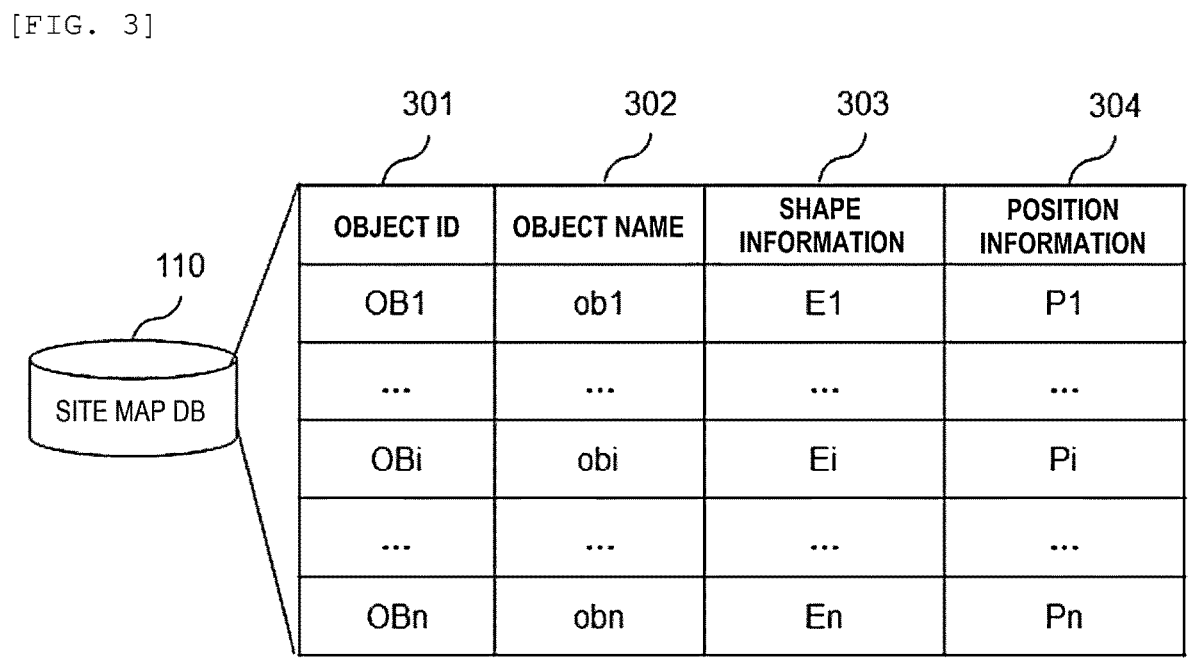

FIG. 3 is a diagram showing an example of the site map DB 110. The site map DB 110 stores object information arranged in a site to be investigated. The object information is created in advance. The site map DB 110 includes an object ID 301, an object name 302, shape information 303, and position information 304 as fields. A combination of values of the fields 301 to 304 in the same row defines object information for identifying an object in the site. In particular, the object ID 301, the shape information 303, and feature information of the object are used.

The object ID 301 is identification information for uniquely identifying an object. Different object IDs 301 are assigned to objects of the same type. The object name 302 is a name of the object identified by the object ID 301. The shape information 303 is data indicating a three-dimensional shape of the object identified by the object ID 301. The position information 304 is a position at which the object identified by the object ID 301 is disposed at the site, and is, for example, a coordinate value in a local coordinate system of the site.

When the site is an outdoor facility, the position information 304 may be latitude and longitude information positioned by the tablet 103 using the GPS system.

<Action Example of Investigator 130>

FIG. 4 is a time chart showing an action example of the investigator 130. The investigator 130 wears the omnidirectional camera 102 on the top portion of the head, carries the tablet 103, and investigates the site. In FIG. 4, an investigation date X will be described as an example.

The investigator 130 starts investigation at the site from a position P0 at a date and time tx0. The omnidirectional camera 102 performs imaging and recording from the investigation start time tx0 by the operation of the investigator 130.

The investigator 130 performs investigation according to an investigation item INV1 at a position P1 at a date and time tx1. For example, according to the investigation item INV1, the investigator 130 inspects a facility at the position P1, inspects whether a work performed by a worker is appropriate, and hears a work content and a state of the facility from the worker. The investigator 130 inputs characters by the tablet 103. Accordingly, the tablet 103 generates a memorandum mx1 which is text data as an investigation result of the investigation item INV1.

Next, the investigator 130 performs investigation according to an investigation item INV2 at a position P2 at a date and time tx2. For according to the investigation item INV2, the investigator 130 inspects a facility at the position P2, inspects whether a work performed by the worker is appropriate, and hears a work content and a state of the facility from the worker. The investigator 130 captures an image of the subject (facility or worker) by the camera of the tablet 103. Accordingly, the tablet 103 generates imaging data pcx2 (still image or moving image) as an investigation result of the investigation item INV2.

Next, the investigator 130 performs investigation according to an investigation item INV3 at a position P3 at a date and time tx3. For example, according to the investigation item INV3, the investigator 130 inspects a facility at the position P3, inspects whether a work performed by the worker is appropriate, and hears a work content and a state of the facility from the worker. The investigator 130 records a conversation with the worker (or a conversation between a plurality of workers) by the microphone of the tablet 103. Accordingly, the tablet 103 generates audio data vx3 as an investigation result of the investigation item INV3.

Next, the investigator 130 performs investigation according to an investigation item INV4 at a position P4 at a date and time tx4. For example, according to the investigation item INV4, the investigator 130 inspects a facility at the position P4, inspects whether a work performed by the worker is appropriate, and hears a work content and a state of the facility from the worker. The investigator 130 inputs characters by the tablet 103 or captures an image of the subject by the camera of the tablet 103. Accordingly, the tablet 103 generates a memorandum mx4 and imaging data pcx4 (still image or moving image) as an investigation result of the investigation item INV4.

Next, the investigator 130 performs investigation according to an investigation item INV5 at a position P5 at a date and time tx5. For example, according to the investigation item INV5, the investigator 130 inspects a facility at the position P5, inspects whether a work performed by the worker is appropriate, and hears a work content and a state of the facility from the worker. The investigator 130 captures an image of the subject by the camera of the tablet 103, or records a conversation with the worker (or a conversation between the plurality of workers) by the microphone of the tablet 103. Accordingly, the tablet 103 generates imaging data pcx5 (still image or moving image) and audio data vx5 as an investigation result of the investigation item INV5.

Finally, the investigator 130 ends the investigation in the site at the position P5 at a date and time tx6. The omnidirectional camera 102 stops imaging and recording at the investigation start date and time tx6 by the operation of the investigator 130.

Next, extraction of omnidirectional imaging data by the server 101 will be described. It is assumed that the server 101 has already acquired data from the omnidirectional camera 102 and the tablet 103.

The server 101 extracts omnidirectional imaging data SI(tx1) having a predetermined time width including the investigation date and time tx1 from omnidirectional imaging data SIx in the entire investigation time of the investigation date and times tx1 to tx6 based on the investigation date and time tx1 of the investigation item INV1. Then, the server 101 separates the omnidirectional imaging data SI(tx1) into front imaging data SIf(tx1) and back imaging data SIb(tx1).

The server 101 separates omnidirectional imaging data SI(tx2) into front imaging data SIf(tx2) and back imaging data SIb(tx2), separates omnidirectional imaging data SI(tx3) into front imaging data SIf(tx3) and back imaging data SIb(tx3), separates omnidirectional imaging data SI(tx4) into front imaging data SIf(tx4) and back imaging data SIb(tx4), and separates omnidirectional imaging data SI(tx5) into front imaging data SIf(tx5) and back imaging data SIb(tx5), by performing the same processing on the investigation date and times tx1 to tx5 of the investigation items INV2 to INV5.

<Information Identification Example>

FIG. 5 is a diagram showing an information identification example 1 by the server 101. It is assumed that the server 101 has already acquired data from the omnidirectional camera 102 and the tablet 103. FIG. 5 shows omnidirectional imaging data SI(tj) extracted at an investigation date and time tj as an example.

The server 101 separates the omnidirectional imaging data SI(tj) into front imaging data SIf(tj) and back imaging data SIb(tj). The front imaging data SIf(tj) includes a facility 501 and a worker W as images. The back imaging data SIb(tj) includes a facility 502 and workers W2 and W3 as images.

The server 101 matches edge data (or a three-dimensional model) of the facility 501 with the shape information 303 of the site map DB 110 by extracting the edge data of the facility 501 or three-dimensionally modeling the facility 501 for the front imaging data SIf(tj). Then, the server 101 determines a value Pj of the position information 304 corresponding to the matching shape information 303 as an investigation position at the investigation date and time tj. The matching includes a case where the edge data (or the three-dimensional model) of the facility 501 matches the shape information 303 of the site map DB 110 and a case where the edge data (or the three-dimensional model) of the facility 501 matches a part of the shape information 303 of the site map DB 110.

In addition, when a two-dimensional code related to the object ID 301 is assigned to the facility 501, the tablet 103 transmits a value generated by reading the two-dimensional code together with the front imaging data SIf(tj) to the server 101. The server 101 compares the value generated by reading the two-dimensional code with the object ID 301, and when there is a matching object ID 301, the server 101 may determine the value Pj of the position information 304 as the investigation position at the investigation date and time tj.

Since a plurality of the facilities 501 of the same type may be arranged, the server 101 matches edge data (or a three-dimensional model) of the facility 502 with the shape information 303 of the site map DB 110 by extracting the edge data of the facility 502 by image processing or three-dimensionally modeling the facility 502 similarly to the back imaging data SIb(tj).

Then, the server 101 uses a position Pj and a value Pk of the position information 304 corresponding to the most similar shape information 303 to identify the position Pj suitable for the position of the investigator 130 among the positions of the plurality of facilities 501. For example, the server 101 calculates a distance between a position Pk and each position of the plurality of facilities 501, and determines the position Pj of the facility 501 having the shortest distance as the position of the investigator 130. In addition, the server 101 searches the site map DB 110 for the object name 302 of the facility 501 at the position Pj, and stores the object name 302 of the facility 501 as an investigation result.

In addition, the server 101 searches the site map DB 110 for the object name 302 corresponding to the position Pk of the facility 502, and stores the object name 302 of the facility 502 as out-of-viewing-angle information.

In addition, the server 101 includes, in the investigation result, audio data received and recorded from the microphone on the front imaging unit 102A side within a predetermined period including the investigation date and time tj. In addition, the server 101 may identify the worker W1 in the front imaging data SIf(tj) as a person by face recognition, presence or absence of movement, or skeleton detection, and may include, in the investigation result, a character string (or a face image of the worker W1) indicating that the worker W1 is a person.

In addition, similarly to the back imaging data SIb(tj), the server 101 identifies the workers W2 and W3 in the back imaging data SIb(tj) as persons by face recognition, presence or absence of movement, or skeleton detection, and stores, as the out-of-viewing-angle information, character strings (or face images of the workers W2 and W3) indicating that the workers W2 and W3 are persons. In addition, the server 101 may include, in the out-of-viewing-angle information, audio data received and recorded from the microphone on the back imaging unit 102B side within the predetermined period including the investigation date and time tj.

FIG. 6 is a diagram showing an information identification example 2 by the server 101. Unlike FIG. 5, the front imaging data SIf(tj) does not include an object serving as a clue for identifying an investigation position. In such a case, the server 101 matches the edge data (or the three-dimensional model) of the facility 502 with the shape information 303 of the site map DB 110 by extracting the edge data of the facility 502 or three-dimensionally modeling the facility 502 for the back imaging data SIb(tj). Then, the server 101 determines the value Pk of the position information 304 corresponding to the most similar shape information 303 as the investigation position at the investigation date and time tj.

In addition, the server 101 searches the site map DB 110 for the object name 302 corresponding to the position Pk of the facility 502, and stores the object name 302 of the facility 502 as out-of-viewing-angle information.

In addition, the server 101 identifies the worker W1 in the front imaging data SIf(tj) as a person by face recognition, presence or absence of movement, or skeleton detection, and includes, in the investigation result, a character string (or a face image of the worker W1) indicating that the worker W1 is a person. In addition, the server 101 may include, in the investigation result, audio data received and recorded from the microphone on the front imaging unit 102A side within a predetermined period including the investigation date and time tj.

<Relationship between Investigation Results on Different Investigation Dates>

FIG. 7 is a diagram showing a relationship between investigation results on different investigation dates. The upper time chart is a time chart showing an action example of the investigator 130 on the investigation date X shown in FIG. 4. The lower time chart is a time chart showing an action example of the investigator 130 on an investigation date Y (≠X) at the same site.

Similarly to FIG. 4, since the upper time chart is an action on the investigation date X, the description has been made using signs including a small character x of the investigation date X. Since the lower time chart is an action on the investigation date Y, signs including a small character y of the investigation date Y is used. On the investigation dates X and Y, the investigator 130 generates the investigation result on the tablet 103 using the same or different user interfaces for each of the investigation items INV1 to INV5. However, since the investigation items INV1 to INV5 are associated with each other, the server 101 can acquire the investigation result of the same investigation item even when the investigation date is different. Accordingly, a user of the server 101 can refer to the investigation results of the same investigation item on different investigation dates.

<Investigation Log DB 120>

FIG. 8 is a diagram showing an example of the investigation log DB 120. FIG. 8 shows investigation logs of the investigation dates X and Y shown in FIG. 7 as an example. The investigation log DB 120 includes an investigation date and time, an investigation position 802, an investigation item 803, an investigation result 804, and out-of-viewing-angle information 805 as fields. A combination of values of the fields 801 to 805 in the same row defines one investigation log.

The investigation date and time 801 is a date and time when the investigation is performed. The investigation position 802 is a position of a site where the investigation is performed at the investigation date and time 801. The investigation items 803 (INV1 to INV5) are contents to be investigated, and include, for example, inspection of facilities and inspection of works by workers.

The investigation result 804 is data generated by the tablet 103 by the operation of the investigator 130 according to the investigation item 803, and includes a memorandum 841, imaging data 842, and audio data 843. The out-of-viewing-angle information 805 includes back imaging data 851 (SIb(tj)) and a recognition result 852 based on the back imaging data 851. The server 101 may store the back imaging data SIb(tj) as it is, or may store back imaging data SIb(tj) after removal of an overlapping range with the front imaging data.

The recognition result 852 includes the position Pk of the facility 502 obtained by the image processing on the back imaging data SIb(tj), and the audio data received and recorded from the microphone on the back imaging unit 102B side.

FIG. 9 is a flowchart showing an example of an investigation support processing procedure by the server 101. The server 101 acquires data including the investigation date and time 801 and the investigation result 804 from the tablet 103 (step S901), and stores the data in the investigation log DB 120 (step S902).

Next, the server 101 acquires omnidirectional imaging data in an investigation period from the omnidirectional camera 102 (step S903). The server 101 extracts omnidirectional imaging data having a predetermined time width including the investigation date and time 801 from the omnidirectional imaging data in the investigation period in units of the investigation date and time 801, and separates the extracted omnidirectional imaging data into front imaging data and back imaging data (step S904).

Next, when an object is present in the front imaging data, the server 101 identifies an investigation position at the investigation date and time 801 using at least the front imaging data of the front imaging data and the back imaging data, and when an object is not present in the front imaging data, the server 101 identifies an investigation position at the investigation date and time 801 using the back imaging data (step S905).

Next, the server 101 executes image recognition based on the back imaging data 851 (step S906). Then, the server 101 stores the recognition result 852 obtained by the image recognition (step S906) together with the back imaging data 851 into the investigation log DB 120 in association with the investigation date and time 801 (step S907).

By accessing the investigation log DB 120, the tablet 103 can display the investigation position 802, the investigation item 803, the investigation result 804, and the out-of-viewing-angle information 805 on another screen at the time of reproducing the omnidirectional imaging data SIx over the entire investigation time of the investigation date and times tx1 to tx6.

FIG. 10 is a diagram showing a display example on the tablet 103. FIG. 10 shows a reproduction example of the omnidirectional imaging data SIx over the entire investigation time of the investigation date and times tx1 to tx6 on the investigation date X. The tablet 103 displays a reproduction region 1001 and a reproduction bar 1002 on a display screen 1000. In the reproduction region 1001, a reproduction button 1011 and a stop button 1012 are displayed. When the reproduction button 1011 is pressed, the omnidirectional imaging data SIx is reproduced, and when the stop button 1012 is pressed, the reproduction is stopped.

The reproduction bar 1002 is a time axis indicating a reproduction time length of the omnidirectional imaging data SIx. In the reproduction bar 1002, a position marker 1020 moves on the reproduction bar 1002 according to a reproduction position of the omnidirectional imaging data SIx. Investigation result icons 1021 to 1027 are displayed on the reproduction bar 1002.

FIG. 11 is a diagram showing a display example of an investigation result when the investigation result icon 1021 is pressed. When the investigation result icon 1021 is pressed, a memorandum screen 1100 showing the memorandum mx1 which is the investigation result 804 of the investigation item INV1 is displayed.

Although not shown, similarly, when the investigation result icon 1022 is pressed, the imaging data pcx2 which is the investigation result 804 of the investigation item INV2 is displayed on another screen. When the investigation result icon 1023 is pressed, the audio data vx3 which is the investigation result 804 of the investigation item INV3 is reproduced. When the investigation result icon 1024 is pressed, the memorandum mx4 which is the investigation result 804 of the investigation item INV4 is displayed on another screen. When the investigation result icon 1025 is pressed, the imaging data pcx4 which is the investigation result 804 of the investigation item INV4 is displayed on another screen. When the investigation result icon 1026 is pressed, the imaging data pcx5 which is the investigation result 804 of the investigation item INV5 is displayed on another screen. When the investigation result icon 1027 is pressed, the audio data vx5 which is the investigation result 804 of the investigation item INV5 is reproduced.

In addition, the investigator 130 can rotate the omnidirectional imaging data SIx by swiping the reproduction region 1001 to the left and right. Accordingly, when the reproduction position is at the investigation date and time 801, the tablet 103 can simultaneously display the investigation result 804 at the investigation date and time 801 and the back imaging data 851 at the same investigation date and time 801. In addition, at this time, the tablet 103 may display the corresponding recognition result 852.

As described above, according to the present embodiment, the investigation result 804 at the same investigation date and time 801 within a viewing angle of the investigator 130 and the out-of-viewing-angle information 805 can be associated with each other. Accordingly, it is possible to improve accuracy of actual investigation at a site. For example, after the investigation, the investigator 130 can find an oversight of the investigation or identify an important portion at the time of re-investigation. In addition, it is also possible to eliminate the need for additional investigation for finding an oversight of the investigation.

The invention is not limited to the above-described embodiments, and includes various modifications and equivalent configurations within the scope of the appended claims. For example, the above-described embodiments are described in detail for easy understanding of the invention, and the invention is not necessarily limited to those including all the configurations described above. A part of a configuration according to one embodiment can be replaced with a configuration according to another embodiment. A configuration according to one embodiment can also be added to a configuration according to another embodiment. A part of a configuration according to each embodiment may also be added, deleted, or replaced with another configuration.

A part or all of the above-described configurations, functions, processing units, processing methods, and the like may be implemented by hardware by, for example, designing with an integrated circuit, or may be implemented by software by, for example, a processor interpreting and executing a program for implementing each function.

Information on such as a program, a table, and a file for implementing each of the functions can be stored in a storage device such as a memory, a hard disk, or a solid state drive (SSD), or in a recording medium such as an integrated circuit (IC) card, an SD card, or a digital versatile disc (DVD).

Control lines and information lines considered to be necessary for description are shown, and all control lines and information lines for implementation are not necessarily shown. Actually, almost all components may be considered to be connected to one another.

The invention claimed is:

1. An investigation support device comprising:

a processor configured to execute a program; and a storage device configured to store the program, wherein the processor is configured to execute;

first acquisition processing of acquiring an investigation result including at least one of text data, imaging data, and audio data in investigation at an investigation date and time, second acquisition processing of acquiring first imaging data imaged from a front of an investigator at the investigation date and time and second imaging data imaged from a back of the investigator at the investigation date and time, identification processing of identifying an investigation position at the investigation date and time based on at least one of the first imaging data and the second imaging data acquired by the second acquisition processing, association processing of associating the investigation result acquired by the first acquisition processing, the second imaging data, and the investigation position identified by the identification processing with the investigation date and time, reproduction processing of reproducing combined imaging data obtained by stitching and combining the first imaging data and the second imaging data, and display processing of displaying the combined imaging data reproduced by the reproduction processing, a time axis indicating a reproduction time length by the reproduction processing, and an icon related to the investigation result arranged at a reproduction position corresponding to the investigation date and time on the time axis.

2. The investigation support device according to claim 1, wherein a database storing feature information and position information of an object is accessible, and in the identification processing, when the first imaging data includes a second object whose second feature information matches feature information of a first object in the database, the processor determines position information of the first object as an investigation position at the investigation date and time.

3. The investigation support device according to claim 2, wherein in the identification processing, when the first imaging data includes a plurality of the second objects whose second feature information matches first feature information of the first object in the database and the second imaging data includes a fourth object whose fourth feature information matches third feature information of a third object in the database, the processor determines, based on position information of the third object, position information of a second object identified from the plurality of second objects as an investigation position at the investigation date and time.

4. The investigation support device according to claim 1, wherein a database storing feature information and position information of an object is accessible, and in the identification processing, when the first imaging data does not include a second object whose second feature information matches first feature information of a first object in the database and the second imaging data includes a fourth object whose fourth feature information matches third feature information of a third object in the database, the processor determines position information of the third object as an investigation position at the investigation date and time.

5. The investigation support device according to claim 1, wherein in the display processing, when the icon displayed by the display processing is selected, the processor displays the investigation result.

6. An investigation support method comprising steps executed by a processor:

first acquisition processing of acquiring an investigation result including at least one of text data, imaging data, and audio data in investigation at an investigation date and time;

second acquisition processing of acquiring first imaging data imaged from a front of an investigator at the investigation date and time and second imaging data imaged from a back of the investigator at the investigation date and time;

identification processing of identifying an investigation position at the investigation date and time based on at least one of the first imaging data and the second imaging data acquired by the second acquisition processing; and association processing of associating the investigation result acquired by the first acquisition processing, the second imaging data, and the investigation position identified by the identification processing with the investigation date and time;

reproduction processing of reproducing combined imaging data obtained by stitching and combining the first imaging data and the second imaging data; and display processing of displaying the combined imaging data reproduced by the reproduction processing, a time axis indicating a reproduction time length by the reproduction processing, and an icon related to the investigation result arranged at a reproduction position corresponding to the investigation date and time on the time axis.

* * * * *